United States Patent
Kang

(10) Patent No.: US 11,453,187 B2
(45) Date of Patent: Sep. 27, 2022

(54) PNEUMATIC TIRE AND METHOD FOR MANUFACTURING SAME

(71) Applicant: The Yokohama Rubber Co., LTD., Tokyo (JP)

(72) Inventor: Hogyun Kang, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 513 days.

(21) Appl. No.: 16/084,953

(22) PCT Filed: Feb. 20, 2017

(86) PCT No.: PCT/JP2017/006117
§ 371 (c)(1),
(2) Date: Sep. 13, 2018

(87) PCT Pub. No.: WO2017/159220
PCT Pub. Date: Sep. 21, 2017

(65) Prior Publication Data
US 2019/0077105 A1 Mar. 14, 2019

(30) Foreign Application Priority Data
Mar. 14, 2016 (JP) .............................. JP2016-049740

(51) Int. Cl.
*B60C 9/14* (2006.01)
*B60C 9/18* (2006.01)
(Continued)

(52) U.S. Cl.
CPC ............. *B29D 30/34* (2013.01); *B29D 30/08* (2013.01); *B60C 5/14* (2013.01); *B60C 5/142* (2013.01);
(Continued)

(58) Field of Classification Search
CPC .......... B60C 2009/1842; B60C 9/1835; B60C 2009/145; B60C 9/14; B60C 5/142;
(Continued)

(56) References Cited

U.S. PATENT DOCUMENTS 3,682,221 A * 8/1972 Marzocchi ............ B60C 9/1821
152/452
6,123,132 A * 9/2000 Appleton ................ B60C 5/142
152/458
(Continued)

FOREIGN PATENT DOCUMENTS

DE 102008038764 A1 * 2/2010 ............... B60C 9/12
JP 2009-279974 12/2009
(Continued)

OTHER PUBLICATIONS

ESpaceNet Translation of DE102008038764A1 (Year: 2020).*
(Continued)

*Primary Examiner* — Katelyn W Smith
*Assistant Examiner* — Alexander D Booth
(74) *Attorney, Agent, or Firm* — Thorpe North & Western

(57) ABSTRACT

Provided are a pneumatic tire and a method for manufacturing the pneumatic tire. A partial tie rubber layer is selectively disposed in each region between a carcass layer and an innerliner layer and on both sides in a tire lateral direction of a tread portion excluding a center region of the tread portion. End portions on both sides of the partial tie rubber layers in the tire lateral direction form inclined surfaces acutely angled with respect to a surface of the partial tie rubber layer on the carcass layer side. The inclined surfaces have an inclination angle from 20° to 60° with respect to the surface of the partial tie rubber layer on the carcass layer side.

6 Claims, 4 Drawing Sheets

(51) Int. Cl.
  *B29D 30/34* (2006.01)
  *B60C 9/08* (2006.01)
  *B60C 5/14* (2006.01)
  *B29D 30/08* (2006.01)
  *B29D 30/16* (2006.01)
  *B29D 30/48* (2006.01)

(52) U.S. Cl.
  CPC .................. *B60C 9/08* (2013.01); *B60C 9/14* (2013.01); *B60C 9/18* (2013.01); *B29D 2030/1678* (2013.01); *B29D 2030/487* (2013.01); *B60C 2009/145* (2013.01)

(58) Field of Classification Search
  CPC ... B60C 9/18; B60C 9/185; B60C 2009/1864; B60C 2009/1892; B60C 2009/2035
  See application file for complete search history.

(56) References Cited

U.S. PATENT DOCUMENTS

| | | | | |
|---|---|---|---|---|
| 6,619,354 | B1* | 9/2003 | Kobayashi | B60C 9/08 152/517 |
| 2006/0027309 | A1* | 2/2006 | Hayashi | B29C 48/3001 156/130 |
| 2006/0144495 | A1 | 7/2006 | Higuchi et al. | |
| 2011/0139328 | A1* | 6/2011 | Pierangelo | B29D 30/3028 152/537 |
| 2011/0186201 | A1* | 8/2011 | Buxton | B60C 15/0632 152/541 |

FOREIGN PATENT DOCUMENTS

| | | |
|---|---|---|
| JP | 5239507 | 7/2013 |
| JP | 5723086 | 5/2015 |
| JP | 2015-174594 | 10/2015 |
| WO | WO 2005/007423 | 1/2005 |

OTHER PUBLICATIONS

ESpaceNet Translation of JP5723086B2 (Year: 2020).*
International Search Report for International Application No. PCT/JP2017/006117 dated May 23, 2017, 4 pages, Japan.

* cited by examiner

PNEUMATIC TIRE AND METHOD FOR MANUFACTURING SAME

TECHNICAL FIELD

The present technology relates to a pneumatic tire that includes a partial tie rubber layer partially and selectively disposed between a carcass layer and an innerliner layer, and a method for manufacturing the same, and more particularly to a pneumatic tire capable of preventing vulcanization defects, which are a concern when a partial tie rubber layer is employed, and adequately demonstrating a reduction in tire weight and rolling resistance due to use of a partial tie rubber layer, and a method for manufacturing the pneumatic tire.

BACKGROUND ART

In a pneumatic tire, when an unvulcanized tire is inflated during tire manufacture, typically a tie rubber layer is disposed between a carcass layer and an innerliner layer to prevent a carcass cord from biting into the innerliner layer. As such a tie rubber layer, a so-called full tie rubber layer disposed across the entire region between the carcass layer and the innerliner layer has been employed in the related art. In contrast, in recent years, the use of a partial tie rubber layer that is not disposed across the entire region between the carcass layer and the innerliner layer, but rather partially and selectively disposed between the carcass layer and the innerliner layer has been proposed (refer to Japan Patent Nos. 5239507 and 5723086, for example). Such a partial tie rubber layer uses a small amount of rubber compared to the full tie rubber layer in the related art, and is thus advantageous in reducing tire weight and rolling resistance.

Nevertheless, such a partial tie rubber layer is primarily provided as a pair, one on each side of a tire equator (in shoulder regions or the like), to sufficiently exhibit functionality as a tie rubber layer, resulting in an increase in the number of ends positioned between the carcass layer and the innerliner layer compared to the full tie rubber layer in the related art. That is, both ends of one full tie rubber layer (two ends) are disposed near a bead portion with the full tie rubber layer in the related art, and both ends of each partial tie rubber layer (four ends total) are disposed in a sidewall portion and a tread portion, respectively, with the pair of partial tie rubber layers. Accordingly, when the partial tie rubber layer is employed and the tire components (the innerliner layer, the partial tie rubber layers, and the carcass layer) are layered during tire manufacture, steps and voids are formed by the partial tie rubber layers, resulting in the problematically high likelihood that air pockets will occur. Thus, even when the partial tie rubber layer is employed, enhancements that make it possible to prevent vulcanization defects such as air pockets are required.

SUMMARY

An object of the present technology is to provide a pneumatic tire capable of preventing vulcanization defects, which are a concern when a partial tie rubber layer is employed, and adequately demonstrating a reduction in tire weight and rolling resistance due to use of a partial tie rubber layer, and a method for manufacturing the pneumatic tire.

A pneumatic tire of the present technology for achieving the above-described object includes an annular tread portion extending in a tire circumferential direction, a pair of side wall portions disposed on both sides of the tread portion, a pair of bead portions disposed inward of the side wall portions in a tire radial direction, a carcass layer mounted between the pair of bead portions, a belt layer disposed on an outer circumferential side of the carcass layer in the tread portion, an innerliner layer disposed on a tire inner surface along the carcass layer, and a partial tie rubber layer selectively disposed in each region between the carcass layer and the innerliner layer and on both sides in a tire lateral direction of the tread portion excluding a center region of the tread portion, end portions on both sides of the partial tie rubber layer in the tire lateral direction forming inclined surfaces acutely angled with respect to a surface of the partial tie rubber layer on the carcass layer side, and the inclined surfaces having an inclination angle from 20° to 60° with respect to the surface of the partial tie rubber layer on the carcass layer side.

Further, a method of manufacturing a pneumatic tire of the present technology for achieving the above-described object includes, molding a green tire obtained by selectively placing an unvulcanized partial tie rubber layer in each part of an unvulcanized innerliner layer or carcass layer corresponding to a region on both sides in a tire lateral direction of a tread portion of a tire after vulcanization excluding a center region of the tread portion and layering an unvulcanized carcass layer on the unvulcanized innerliner layer via the unvulcanized partial tie rubber layer, and vulcanizing the green tire while pressing the green tire from an inner side using a bladder, inclined surfaces being formed acutely angled with respect to one surface of the unvulcanized partial tie rubber layers on both end portions of the unvulcanized partial tie rubber layer in a width direction, an inclination angle of the inclined surfaces with respect to the one surface being from 20° to 60°, and the unvulcanized partial tie rubber layer being layered between the unvulcanized innerliner layer and the unvulcanized carcass layer at an orientation of the one surface facing on the unvulcanized carcass layer side.

In the pneumatic tire of the present technology, in using the partial tie rubber layer to reduce tire weight and rolling resistance in comparison with a pneumatic tire in the related art including a full tie rubber layer, the end portions of each partial tie rubber layer are formed into inclined surfaces having a specific angle as described above, making it possible to suppress the formation of steps and voids which cause air pockets between the innerliner layer, the carcass layer, and the end portions of the partial tie rubber layers when layering the tire components during tire manufacture, and thus prevent the occurrence of vulcanization defects.

In the method for manufacturing a pneumatic tire of the present technology, the end portions of the unvulcanized partial tie rubber layers are formed into inclined surfaces having a specific angle as described above, and the orientation when layering the partial tie rubber layers is specified, making the formation of steps and voids which cause air pockets between the innerliner layer, the carcass layer, and the end portions of the partial tie rubber layers less likely to occur when the tire components are pressed using the bladder during tire manufacture, and thus making it possible to prevent the occurrence of vulcanization defects.

In the present technology, preferably the partial tie rubber layer is made of rubber having a hardness from 50 to 70. With the hardness of the partial tie rubber layer thus set, it is possible to favorably maintain a shape of the partial tie rubber layer, which is advantageous in enhancing air removability and preventing vulcanization defects. Note that the "hardness" of the rubber in the present technology is a hardness that is measured using a type A durometer at a temperature of 20° C. in accordance with JIS (Japanese Industrial Standard) K6253 (a so-called JIS-A hardness).

In the present technology, preferably the partial tie rubber layer has a thickness from 0.1 to 1.0 mm. With the thickness of the partial tie rubber layer thus set, it is possible to favorably maintain the shape of the partial tie rubber layer, which is advantageous in enhancing air removability and preventing vulcanization defects.

In the present technology, preferably the partial tie rubber layer has a periphery length from 30 to 120 mm. With the length of the partial tie rubber layer thus set and optimized within a suitable range, it is possible to provide good reduction in tire weight and rolling resistance as well as prevention of vulcanization defects in a compatible manner to a high degree. Note that the "periphery length" in the present technology is the length measured in an extending direction of the tire constituent (partial tie rubber layer) in a tire meridian cross section.

DETAILED DESCRIPTION

Configuration of embodiments of the present technology are described in detail below with reference to the accompanying drawings.

Figure 1:
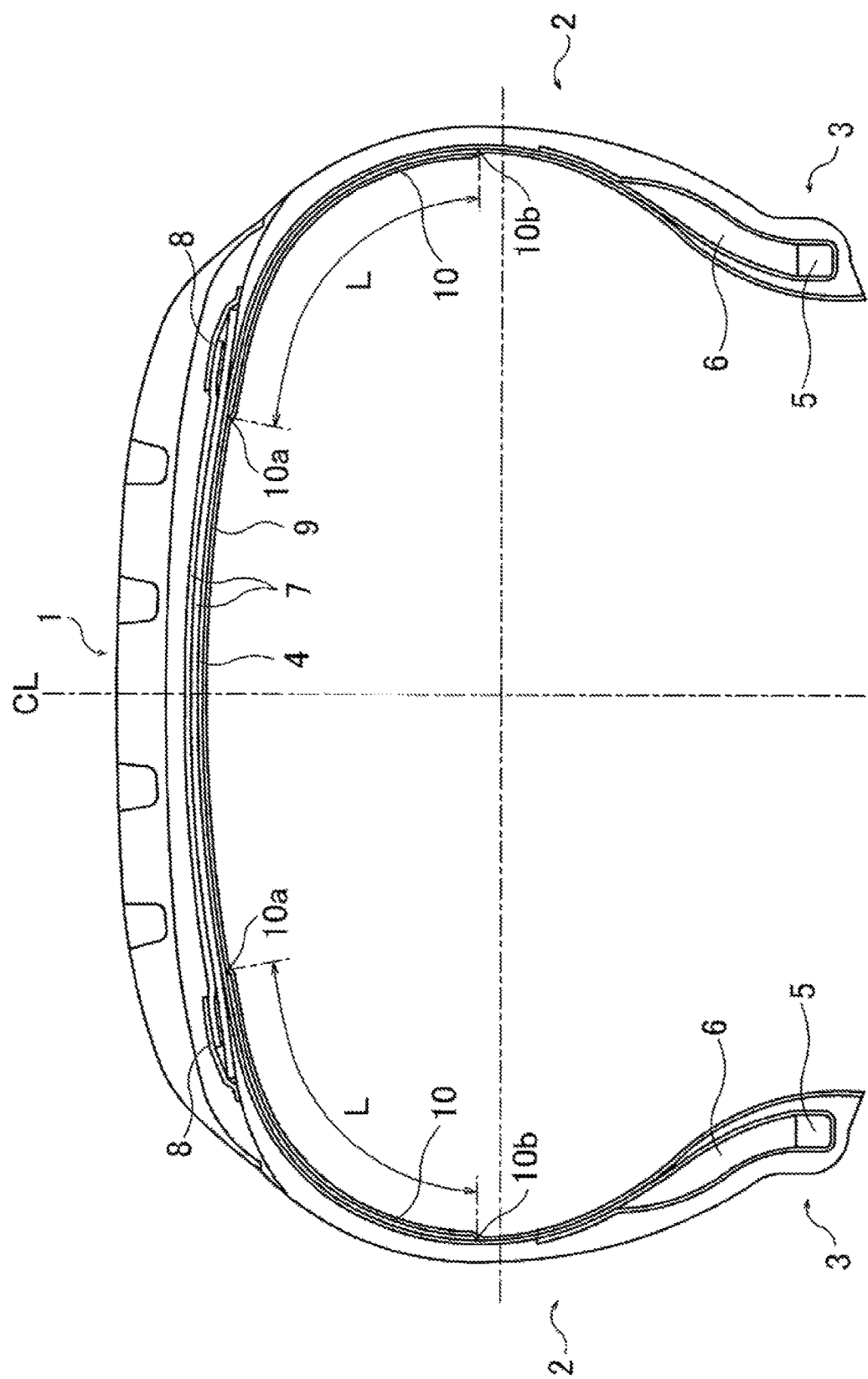
FIG. 1 is a meridian cross-sectional view of a pneumatic tire according to an embodiment of the present technology.

As illustrated in FIG. 1, the pneumatic tire of the present technology includes an annular tread portion 1 extending in a tire circumferential direction, a pair of sidewall portions 2 disposed on both sides of the tread portion 1, and a pair of bead portions 3 disposed inward of the sidewall portions 2 in a tire radial direction. Note that the reference sign CL in FIG. 1 denotes a tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each of the bead filler 6 is enveloped by a main body portion and a folded back portion of the carcass layer 4. On the other hand, in the tread portion 1, a plurality of belt layers 7 (two layers in FIGS. 1 to 3B) are embedded on the outer circumferential side of the carcass layer 4. The belt layers 7 each include a plurality of reinforcing cords that are inclined with respect to the tire circumferential direction, and the direction of the reinforcing cords of the different layers intersect each other. In these belt layers 7, the inclination angle of the reinforcing cords with respect to the tire circumferential direction is set in the range, for example, from 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

Further, an innerliner layer 9 is provided on the tire inner surface. The inner liner layer 9 is made of a rubber composition mainly including butyl rubber having an air permeation preventive performance, preventing the air filled in the tire from permeating outside the tire.

A partial tie rubber layer 10 is disposed between such an innerliner layer 9 and a carcass layer 4. A tie rubber layer disposed between the innerliner layer 9 and the carcass layer 4 is a layer for preventing the carcass cord from biting into the innerliner layer 9 when the unvulcanized pneumatic tire is inflated during tire manufacture, and contributes to the air permeation preventive properties and steering stability on dry road surfaces of the tire after manufacture. While the tie rubber layer in the related art has been provided to cover the entire region between the carcass layer 4 and the innerliner layer 9 (full tie rubber layer), the tie rubber layer in the present technology is selectively provided as the partial tie rubber layer 10 in each region excluding the bead portions 3 and a center region of the tread portion 1. That is, as illustrated in FIG. 1, the partial tie rubber layer 10 is provided in each region on the tread portion 1 including a shoulder region and the side wall portion 2, on both sides of the tire equator CL in the tire lateral direction.

Figure 2:
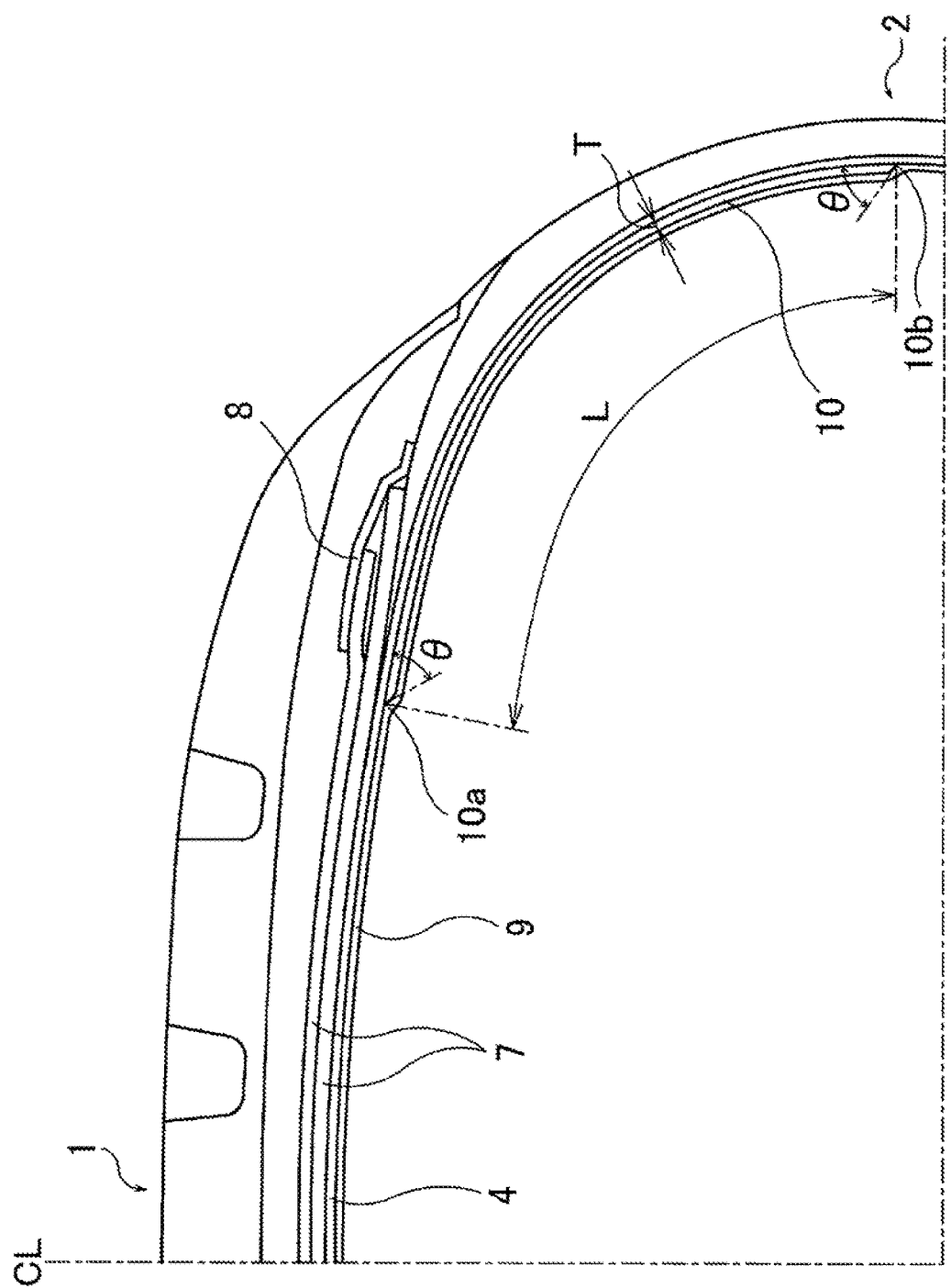
FIG. 2 is a meridian cross-sectional view enlarging and illustrating the main portion of the pneumatic tire of FIG. 1.

In this partial tie rubber layer 10, as illustrated in the enlarged view in FIG. 2, the end portions on both sides in the tire lateral direction (an end portion 10a inward in the tire lateral direction and an end portion 10b outward in the tire lateral direction) each form an inclined surface acutely angled with respect to a surface of the partial tie rubber layer 10 on the carcass layer 4 side. The inclination angles θ of the inclined surfaces with respect to the surface of the partial tie rubber layer 10 on the carcass layer 4 side are each from 20° to 60°.

Figure 3A:
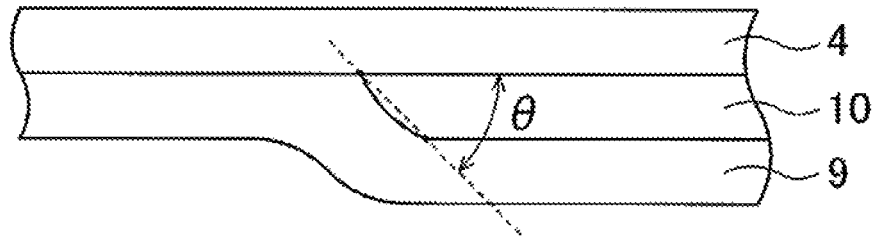
FIGS. 3A and 3B are main portion cross-sectional views for explaining a method for measuring an inclination angle θ.
Figure 3B:
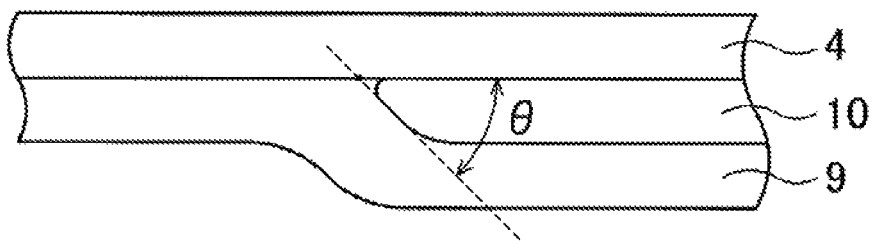

Note that, in the present technology, the inclination angle θ is measured as illustrated in FIGS. 3A and 3B. That is, as illustrated in FIG. 3A, when edges of the inclined surface of the partial tie rubber layer 10 with the surface on the carcass layer 4 side and with the surface on the innerliner layer 9 side are clear in a meridian cross section, the angle formed by a line connecting these edges and the surface of the partial tie rubber layer 10 on the carcass layer 4 side is defined as the inclination angle θ. Further, as illustrated in FIG. 3B, when the edge of the inclined surface of the partial tie rubber layer 10 with the surface on the carcass layer 4 side is not clear in a meridian cross section, the angle formed by an imaginary line obtained by extending a portion of the linearly extending inclined surface and an extension line of the surface of the partial tie rubber layer 10 on the carcass layer 4 side is defined as the inclination angle θ.

Thus, both end portions 10a, 10b of the partial tie rubber layer 10 are formed into inclined surfaces having a specific angle, making it possible to suppress the formation of steps and voids which cause air pockets between the innerliner layer 9, the carcass layer 4, and the end portions 10a, 10b of the partial tie rubber layers 10 when layering the tire components during tire manufacture, and thus prevent the occurrence of vulcanization defects. With vulcanization defects prevented by thus specifying the end portion structure, the effect of employing the partial tie rubber layer 10 can be maintained. That is, it is possible to decrease tire weight and reduce rolling resistance compared to the pneumatic tire in the related art that includes the full tie rubber layer.

At this time, when the inclination directions of the inclined surfaces are the opposite (when the inclined surfaces form an acute angle with respect to the surface on the innerliner layer 9 side), the end portion structure of the partial tie rubber layer 10 is not appropriate, making it difficult to adequately increase air removability. Further, when the inclination angle θ is less than 20°, the end of the partial tie rubber layer 10 is too thin, possibly inhibiting the functionality of the tie rubber layer. When the inclination angle θ is greater than 60°, an adequate inclination is not present, and thus the advantages resulting from an inclined surface cannot be achieved. Note that the inclination angle θ is preferably from 35° to 55°.

Figure 4A:
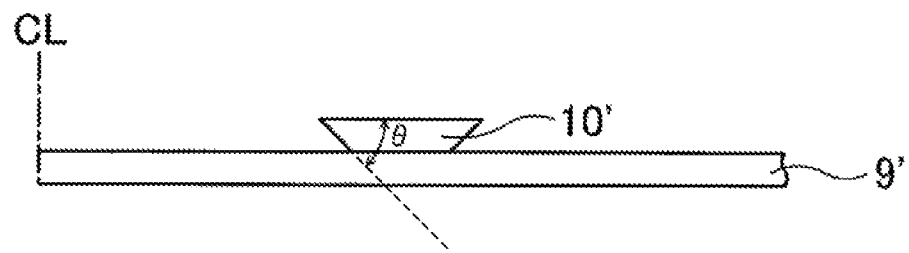
FIGS. 4A and 4B are schematic diagrams for explaining a method for manufacturing a pneumatic tire of the present technology.
Figure 4B:
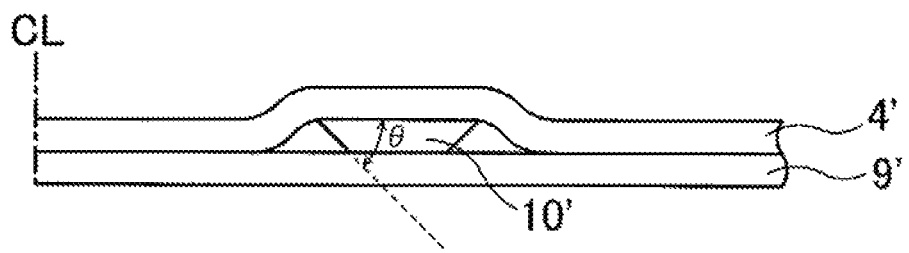

A pneumatic tire provided with the partial tie rubber layer 10 having such a shape is, for example, manufactured as follows. First, as illustrated in FIG. 4A, an unvulcanized partial tie rubber layer 10' is selectively placed on each part of an unvulcanized innerliner layer 9' corresponding to a region of the tread portion 1 of the tire after vulcanization on both sides in the tire lateral direction, excluding the center region of the tread portion 1. Then, as illustrated in FIG. 4B, an unvulcanized carcass layer 4' is layered on the unvulcanized innerliner layer 9' via the unvulcanized partial tie rubber layer 10'. Subsequently, other tire components are layered to mold a green tire. Then, the green tire is vulcanized while pressed using a bladder from the inner side, thereby manufacturing a pneumatic tire. At this time, both end portions of the unvulcanized partial tie rubber layer 10' in the width direction have an inclined surface acutely angled with respect to each one surface of the unvulcanized partial tie rubber layer 10', as illustrated. Then, the inclination angle θ of this inclined surface with respect to the one surface is set to from 20° to 60°. Further, as illustrated, when the unvulcanized partial tie rubber layer 10' is layered on the unvulcanized innerliner layer 9', the unvulcanized partial tie rubber layer 10' is layered on the unvulcanized innerliner layer 9' at an orientation that positions the one surface facing on the unvulcanized carcass layer 4' side.

In this way, as illustrated in FIG. 4B, while voids are formed between the innerliner layer 9', the carcass layer 4', and the ends of the partial tie rubber layer 10' with these tire components simply layered, the innerliner layer 9', which is softer than the carcass layer 4' provided with embedded reinforcement cords (carcass cords), deforms so as to extend along the inclined surfaces of the partial tie rubber layer 10' in the step of vulcanizing the green tire while pressing the green tire using the bladder, causing the air in the voids illustrated in FIG. 4B to be pushed out at this time and the voids to no longer remain in the tire after vulcanization, as illustrated in FIG. 2 and the like. Thus, air removal is favorably performed and air pockets no longer occur, making it possible to effectively prevent vulcanization defects.

Moreover, while in the example in FIGS. 4A and 4B the unvulcanized partial tie rubber layer 10' is first placed on the unvulcanized innerliner layer 9' and then the other tire components (unvulcanized carcass layer 4' and the like) are layered sequentially thereon, in the present technology both ends of the unvulcanized partial tie rubber layer 10' in the width direction need only be inclined surfaces acutely inclined with respect to one surface of the unvulcanized partial tie rubber layer 10' with the unvulcanized innerliner layer 9', the unvulcanized partial tie rubber layer 10', and the unvulcanized carcass layer 4' in a layered state, and thus the unvulcanized partial tie rubber layer 10' need only be placed on the unvulcanized carcass layer 4'.

The physical properties of the partial tie rubber layer 10, while not particularly limited, include a rubber hardness that is preferably from 50 to 70, and more preferably from 55 to 65. Setting the hardness of the partial tie rubber layer 10 in this way makes it possible to favorably maintain a shape of the partial tie rubber layer 10, and is advantageous in enhancing air removability and preventing vulcanization defects. At this time, when the rubber hardness is less than 50, the rigidity of the partial tie rubber layer 10 is significantly low, making it difficult to maintain the shape of the partial tie rubber layer 10, which causes a decrease in air removability and thus makes it difficult to adequately prevent vulcanization defects. When the hardness of the partial tie rubber layer 10 is greater than 70, the rigidity of the sidewall portions 2 is too high, potentially adversely affecting the fundamental performance of the pneumatic tire.

While the partial tie rubber layer 10 requires adequate thickness to sufficiently exhibit functionality as a tie rubber layer (preventing the carcass cord from biting into the innerliner layer 9 during tire manufacture), it is preferable to suppress the used amount to reduce tire weight. Additionally, the partial tie rubber layer 10 also requires appropriate thickness to maintain the shape of the partial tie rubber layer 10 and allow good air removability. Therefore, according to the present technology, a thickness T of the partial tie rubber layer 10 may be preferably set to from 0.1 to 1.0 mm, and more preferably from 0.3 to 0.7 mm. Accordingly, it is possible to adequately exhibit a tire weight reduction effect while adequately exhibiting functionality as a tie rubber layer. Further, such a thickness is advantageous in terms of vulcanization defects as well. At this time, when the thickness T of the partial tie rubber layer 10 is less than 0.1 mm, the partial tie rubber layer 10 is too thin, causing the partial tie rubber layer 10 to not adequately function as a tie rubber layer, and limiting the effect of preventing the carcass cord from biting into the innerliner layer 9 during tire manufacture. Further, such a thickness makes it difficult to maintain the shape of the partial tie rubber layer 10, which causes a decrease in air removability and thus makes it difficult to adequately prevent vulcanization defects. When the thickness T of the partial tie rubber layer 10 is greater than 1.0 mm, the partial tie rubber layer 10 is too thick and the used amount increases, limiting the effect of tire weight reduction.

The partial tie rubber layer 10, as described above, is intended to prevent the carcass cord from biting into the innerliner layer 9 during tire manufacture, and thus preferably covers appropriate regions between the carcass layer 4 and the inner liner layer 9. Thus, according to the present technology, the periphery length of the partial tie rubber layer 10 may be preferably set to from 30 to 120 mm, and more preferably from 40 to 80 mm. Accordingly, the periphery length of the partial tie rubber layer 10 can be optimized, which is advantageous in providing good functionality as a tie rubber layer and reduction in tire weight and rolling resistance in a compatible manner. At this time, when a periphery length L of the partial tie rubber layer 10 is less than 30 mm, difficulties arise in covering the appropriate regions between the carcass layer 4 and the innerliner layer 9 with the partial tie rubber layer 10, making it less likely that the partial tie rubber layer 10 will adequately exhibit functionality as a tie rubber layer. When the periphery length L of the partial tie rubber layer 10 is greater than 120 mm, the used amount of the partial tie rubber layer 10 increases, limiting the effect of tire weight reduction.

EXAMPLES

Twenty-one types of pneumatic tires, namely Conventional Example 1, Comparative Examples 1 to 4, and Examples 1 to 16, were manufactured, each having a tire size of 195/65R15 and the basic structure illustrated in FIG. 1, and the structure of the tie rubber layer, the inclination angle θ of the inclined surfaces formed at the end portions of the partial tie rubber layer, the rubber hardness of the partial tie rubber layer, the rubber thickness of the partial tie rubber layer, and the periphery length of the partial tie rubber layer set as shown in Tables 1 and 2.

Note that the "Structure of tie rubber layer" sections in Tables 1 and 2 indicate "Full" when the tie rubber layer is a full tie rubber layer, and "Partial" when the tie rubber layer is a partial tie rubber layer.

These 21 types of pneumatic tires were evaluated for the used amount of tie rubber, air permeation preventive properties, and steering stability on dry road surfaces by the evaluation methods described below, and the results are shown in Tables 1 to 2.

Used Amount of Tie Rubber

The used amount of tie rubber of each test tire was measured. Evaluation results were expressed as index values with the measurement value of Conventional Example 1 being assigned the index value of 100. Smaller index values indicate a lesser used amount of tie rubber and, thus, successful tire weight reduction. Note that an index value of "85" or less indicates that the used amount of tie rubber is adequately small, and that an excellent effect of tire weight reduction has been achieved. Conversely, an index value greater than "85" indicates that the used amount of tie rubber was not adequately reduced, and that an effect of tire weight reduction has not been substantially achieved. In particular, an index value of "70" or less indicates that a very excellent effect of tire weight reduction has been achieved.

Rolling Resistance

The test tires were assembled on wheels having a rim size of 15x6J and, using a drum testing machine having a drum diameter of 1707.6 mm, rolling resistance was measured under the following conditions: air pressure is 210 kPa, load is 4.82 kN, and speed is 80 km/h, in compliance with ISO 28580. Evaluation results were expressed as index values with the reciprocal of the measurement value of Conventional Example 1 being assigned the index value of 100. Higher index values indicate lower rolling resistance.

Defect Rate

One-hundred tires were manufactured for each test tire, and the inner surface of each tire after molding and vulcanization was observed visually verifying the presence or absence of inner surface defects in the molding and vulcanization steps, and measured the defect rate (the ratio of the number of tires in which an inner defect occurred to the total number of tires). Evaluation results were expressed as index values with the reciprocal of the measurement value of Conventional Example 1 being assigned the index value of 100. Higher index values indicate a lower inner surface defect rate.

TABLE 1

|  |  | Conventional Example 1 | Comparative Example 1 | Comparative Example 2 | Example 1 | Comparative Example 3 |
|---|---|---|---|---|---|---|
| Structure of tie rubber layer |  | Full | Partial | Partial | Partial | Partial |
| Inclination angle θ | ° | — | 90 | 135 | 45 | 10 |
| Rubber hardness |  | 60 | 60 | 60 | 60 | 60 |
| Rubber thickness T | mm | 0.5 | 0.5 | 0.5 | 0.5 | 0.5 |
| Periphery length L | mm | 420 | 60 | 60 | 60 | 60 |
| Used amount of tie rubber | Index value | 100 | 38 | 35 | 35 | 30 |
| Rolling resistance | Index value | 100 | 103 | 103 | 105 | 100 |
| Defect rate | Index value | 100 | 94 | 96 | 101 | 99 |

|  |  | Example 2 | Example 3 | Example 4 | Example 5 | Comparative Example 4 |
|---|---|---|---|---|---|---|
| Structure of tie rubber layer |  | Partial | Partial | Partial | Partial | Partial |
| Inclination angle θ | ° | 20 | 35 | 55 | 60 | 70 |
| Rubber hardness |  | 60 | 60 | 60 | 60 | 60 |
| Rubber thickness T | mm | 0.5 | 0.5 | 0.5 | 0.5 | 0.5 |
| Periphery length L | mm | 60 | 60 | 60 | 60 | 60 |
| Used amount of tie rubber | Index value | 32 | 34 | 36 | 36 | 37 |
| Rolling resistance | Index value | 102 | 105 | 105 | 104 | 104 |
| Defect rate | Index value | 100 | 101 | 101 | 100 | 98 |

TABLE 2

|  |  | Example 6 | Example 7 | Example 8 | Example 9 | Example 10 |
|---|---|---|---|---|---|---|
| Structure of tie rubber layer |  | Partial | Partial | Partial | Partial | Partial |
| Inclination angle θ | ° | 45 | 45 | 45 | 45 | 45 |
| Rubber hardness |  | 45 | 50 | 70 | 75 | 60 |
| Rubber thickness T | mm | 0.5 | 0.5 | 0.5 | 0.5 | 0.1 |

TABLE 2-continued

|  |  |  |  |  |  |  |
|---|---|---|---|---|---|---|
| Periphery length L | mm | 60 | 60 | 60 | 60 | 60 |
| Used amount of tie rubber | Index value | 35 | 35 | 35 | 35 | 7 |
| Rolling resistance | Index value | 105 | 105 | 105 | 105 | 102 |
| Defect rate | Index value | 100 | 101 | 101 | 100 | 101 |

|  |  | Example 11 | Example 12 | Example 13 | Example 14 | Example 15 | Example 16 |
|---|---|---|---|---|---|---|---|
| Structure of tie rubber layer |  | Partial | Partial | Partial | Partial | Partial | Partial |
| Inclination angle θ | ° | 45 | 45 | 45 | 45 | 45 | 45 |
| Rubber hardness |  | 60 | 60 | 60 | 60 | 60 | 60 |
| Rubber thickness T | mm | 1.0 | 1.2 | 0.5 | 0.5 | 0.5 | 0.5 |
| Periphery length L | mm | 60 | 60 | 20 | 30 | 120 | 130 |
| Used amount of tie rubber | Index value | 70 | 84 | 12 | 18 | 70 | 76 |
| Rolling resistance | Index value | 104 | 101 | 102 | 103 | 103 | 101 |
| Defect rate | Index value | 101 | 100 | 100 | 101 | 101 | 100 |

As is apparently shown in Tables 1 and 2, each of the Examples 1 to 16 exhibited a reduction in the used amount of tie rubber, a reduction in rolling resistance, and an improvement in defect rate compared to Conventional Example 1.

On the other hand, Comparative Example 1 had an inclination angle θ of 90° and the ends of the partial tie rubber layer were not inclined, and thus enhancements in air removability, resulting from inclined surfaces, were not found and the defect rate deteriorated. Comparative Example 2 had an inclination angle θ of 135° and the orientation of the partial tie rubber layer was reversed, and thus enhancements in air removability, resulting from inclined surfaces, were not found and the defect rate deteriorated. Comparative Example 3 had an inclination angle θ that was too small, and thus the defect rate could not be adequately maintained. Comparative Example 4 had an inclination angle θ that was too large, and thus the defect rate was substantially the same as that in Comparative Example 1 and could not be improved.

The invention claimed is:

1. A pneumatic tire, comprising:
   an annular tread portion extending in a tire circumferential direction;
   a pair of side wall portions disposed on both sides of the tread portion;
   a pair of bead portions disposed inward of the side wall portions in a tire radial direction;
   a carcass layer mounted between the pair of bead portions;
   a belt layer disposed on an outer circumferential side of the carcass layer in the tread portion;
   an innerliner layer disposed on a tire inner surface along the carcass layer; and
   a partial tie rubber layer selectively disposed in each region between the carcass layer and the innerliner layer and on both sides in a tire lateral direction of the tread portion excluding a center region of the tread portion;
   end portions on both sides of the partial tie rubber layer in the tire lateral direction forming inclined surfaces acutely angled with respect to a surface of the partial tie rubber layer on the carcass layer side; and
   the inclined surfaces having an inclination angle from 20° to 60° with respect to the surface of the partial tie rubber layer on the carcass layer side;
   wherein the pneumatic tire is a green tire with voids formed between the innerliner layer and the carcass layer at the end portions of the partial tie rubber layer, the innerliner layer being configured to deform and eliminate the voids during vulcanization.

2. The pneumatic tire according to claim 1, wherein the partial tie rubber layer is made of rubber having a hardness from 50 to 70.

3. The pneumatic tire according to claim 1, wherein the partial tie rubber layer has a thickness from 0.1 to 1.0 mm.

4. The pneumatic tire according to claim 1, wherein the partial tie rubber layer has a periphery length from 30 to 120 mm.

5. The pneumatic tire according to claim 2, wherein the partial tie rubber layer has a thickness from 0.1 to 1.0 mm.

6. The pneumatic tire according to claim 5, wherein the partial tie rubber layer has a periphery length from 30 to 120 mm.

* * * * *